(12) United States Patent
Fishman (10) Patent No.: US 11,704,885 B2
(45) Date of Patent: Jul. 18, 2023

(54) AUGMENTED REALITY (AR) VISUAL DISPLAY TO SAVE

(71) Applicant: Richard Fishman, Parkland, FL (US)

(72) Inventor: Richard Fishman, Parkland, FL (US)

( * ) Notice: Subject to any disclaimer, the term of this patent is extended or adjusted under 35 U.S.C. 154(b) by 0 days.

(21) Appl. No.: 17/554,041

(22) Filed: Dec. 17, 2021

(65) Prior Publication Data

US 2023/0196697 A1    Jun. 22, 2023

(51) Int. Cl.
*G06T 19/20* (2011.01)
*G06T 19/00* (2011.01)
*G06F 3/04845* (2022.01)

(52) U.S. Cl.
CPC .......... *G06T 19/20* (2013.01); *G06F 3/04845* (2013.01); *G06T 19/006* (2013.01); *G06T 2200/24* (2013.01); *G06T 2219/2004* (2013.01)

(58) Field of Classification Search
CPC .............................. G06T 19/006; G06T 19/20
See application file for complete search history.

(56) References Cited

U.S. PATENT DOCUMENTS

| | | | |
|---|---|---|---|
| 10,706,624 B1* | 7/2020 | Chuah | G06T 19/003 |
| 2012/0249741 A1* | 10/2012 | Maciocci | G06T 19/006 348/51 |
| 2020/0258144 A1* | 8/2020 | Chaturvedi | G06T 7/50 |

* cited by examiner

*Primary Examiner* — Charles Tseng
(74) *Attorney, Agent, or Firm* — Gearhart Law LLC (57) ABSTRACT

Systems and methods for providing an AR visual display to save are described. A camera of a computing device scans an area and an AR engine of the computing device extrapolates flat portions of the area. A digital representation of the area is displayed via a GUI of the computing device to allow a user to place digitally created content. The digitally created content is textual content, 2D content, 3D content, video content, and/or audio content. The AR engine receives, from a user, an action executed on a surface and at a location of the digital representation to add a tag or an anchor. The AR engine utilizes planes as indicators to save the placement of the tag or the anchor and transmits the placement of the tag or the anchor to a server. The placement of the tag or the anchor allows for viewing from other computing devices.

10 Claims, 6 Drawing Sheets

AUGMENTED REALITY (AR) VISUAL DISPLAY TO SAVE

CROSS-REFERENCE TO RELATED APPLICATIONS

This application is a U.S. Non-Provisional Patent application that does not claim priority to any other application.

FIELD OF THE EMBODIMENTS

The field of the invention and its embodiments relate to an augmented reality (AR) visual display to save.

BACKGROUND OF THE EMBODIMENTS

Recently, AR techniques have become increasingly popular. In general, AR is a live, direct or indirect, view of a physical, real-world environment whose elements are augmented by computer-generated sensory input, such as sound, video, graphics or GPS data. Distinctly, virtual reality systems replace the real world with a simulated one. As a first example, marker-based AR techniques are based on the computer identifying artificial markers in the real world (such as QR codes, barcodes, or similar markers) and superimpose computer-generated images based on where the markers are located. This area requires significant image processing tasks done by the computer. Positional-based AR techniques are based on where the user is located, where the user is pointing to, and where the objects of interest are located relative to the user. The computer then will superimpose images on top of the real-world image gathered. The computer doesn't need to do much image processing (almost none at all) except for superimposing the generated image on top of the camera image. In other examples, object/feature recognition techniques involve the computer recognizing real-world objects directly and thus the markers are no longer needed. However, none of these AR systems allow the user to scan an area, display a digitial representation of the area, and allow the user to both tag a portion of the area and place digitally created content. The instant invention provides this solution.

Examples of Related Art Include:

U.S. Pat. No. 10,838,574 B2 describes a system, method, and computer program product for saving and loading workspaces in AR environments. An embodiment of this reference operates by receiving a selection of an AR meeting space to open in a current physical location, where the AR meeting space was previously configured for a remote physical location different from the current physical location. A selection of an AR meeting space to open in a current physical location is received. An arrangement of one or more digital objects of the selected AR meeting space is determined. A current anchor area within the current physical location that corresponds to a remote anchor area of the remote physical location is identified. The arrangement of the one or more digital objects of the AR meeting space is modified in the current physical location based on an alignment of the current anchor area with the remote anchor area.

U S. Published Patent Application No. 2020/0111255 A1 describes AR systems and methods for creating, saving and rendering designs comprising multiple items of virtual content in a three-dimensional (3D) environment of a user. The designs may be saved as a scene, which is built by a user from pre-built sub-components, built components, and/or previously saved scenes. Location information, expressed as a saved scene anchor and position relative to the saved scene anchor for each item of virtual content, may also be saved. Upon opening the scene, the saved scene anchor node may be correlated to a location within the mixed reality environment of the user for whom the scene is opened. The virtual items of the scene may be positioned with the same relationship to that location as they have to the saved scene anchor node. That location may be selected automatically and/or by user input.

EP3531649B1 discloses an interactive mode combining an online requirement of distributing a virtual object to a user based on AR technology, and an offline image scanning operation performed by a user on an AR client. A user can actively perform, using the AR client, image scanning on an offline preset pattern identifier, to trigger an AR server to transmit to the AR client electronic certificates for obtaining virtual objects, and receive, using the AR client, the electronic certificates transmitted by the AR server. When a category count of electronic certificates received by the user reaches a predetermined threshold, the user can obtain permission of distributing the virtual objects. The AR client can actively send to the AR server a virtual object distribution request containing a plurality of electronic certificates having a category count equal to the predetermined threshold. The AR server distributes an object from a preset virtual object set to the user, thereby significantly increasing interactivity and an entertaining value of distribution of virtual objects.

WO 2020/148659 A3 describes a system, method, platform, database, search engine and device related to providing reactions and answer of survey questions and conducting actions and call-to-actions by scanning object from augmented reality system or application, applying one or more types of gestures, multi-touch and movement of user device, providing vice command and eye or body expressions commands.

Some similar systems exist in the art. However, their means of operation are substantially different from the present disclosure, as the other inventions fail to solve all the problems taught by the present disclosure.

SUMMARY OF THE EMBODIMENTS

The present invention and its embodiments relate to an AR visual display to save.

A first embodiment of the present invention describes a method executed by a computing device for providing an AR visual display to save. The method includes numerous process steps, such as: scanning, by a camera of the computing device, an area; extrapolating, by an AR engine of the computing device, flat portions of the area; and displaying a digital representation of the area via a graphical user interface (GUI) of the computing device to allow a user to place digitally created content. The digitally created content is textual content, two-dimensional (2D) content, three-dimensional (3D) content, video content, and/or audio content. Moreover, the digital representation comprises grids and/or planes such that, in some examples, the AR engine overlays the grids on the planes to assist the user visually with the digital representation. AR glasses may also be used to assist in visualization of the digital representation.

The method also includes: receiving, by the AR engine and from the user, an action executed on a surface and at a location of the digital representation to add a tag or anchor; utilizing, by the AR engine, planes as indicators to save the tag, transmitting, by the AR engine, the tag placement to a server; and displaying, by the AR engine and via the GUI, the tag placement at the location of the digital representation. It should be appreciated that the tag placement allows for viewing from other devices.

A second embodiment of the present invention describes a computer system. The computer system includes one or more processors, one or more memories, and one or more computer-readable hardware storage devices. The one or more computer-readable hardware storage devices contain program code executable by the one or more processors via the one or more memories to implement a method for providing an AR visual display to save.

The method includes numerous process steps, such as: scanning, by a camera, an area; extrapolating flat portions of the area; and displaying a digital representation of the area via a GUI to allow a user to place digitally created content. The digitally created content includes textual content, 2D content, 3D content, video content, and/or audio content. In some instances, the method includes overlaying grids on planes of the digital representation to assist the user visually. In other examples, the user may utilize AR glasses to assist in visualization of the digital representation.

The method further includes: receiving, from the user, an action executed on a surface and at a location of the digital representation to add or place a tag; utilizing planes as indicators to save the tag placement; transmitting the tag placement to a server; and displaying, via the GUI, the tag placement at the location of the digital representation. The tag placement allows for viewing from other devices.

A third embodiment of the present invention describes a computing device. The computing device includes, at least, a camera configured to scan an area, an AR engine configured to extrapolate flat portions of the area, and a GUI configured to display a digital representation of the area to allow a user to place digitally created content. The digitally created content includes textual content, 2D content, 3D content, video content, and/or audio content.

Moreover, the AR engine is further configured to: receive an action executed on a surface and at a location of the digital representation to add a tag or anchor; utilize planes as indicators to save the tag placement; and transmit the tag placement to a server. The tag placement allows for viewing from other devices. The GUI is further configured to display the tag placement at the location of the digital representation. In some instances, the AR engine is further configured to: overlay grids on planes to assist the user visually with the digital representation.

DESCRIPTION OF THE PREFERRED EMBODIMENTS

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As described herein, "augmented reality" or "AR" is a real-time direct or indirect view of a physical real-world environment that has been enhanced/augmented by adding virtual computer-generated sensory inputs, such as GPS, graphics, video, sound, data statistics, etc. AR is both interactive and registered in 3D, and further combines real and virtual objects. In contrast to virtual reality, which replaces the real-world environment with a simulated one, augmented reality elements are often displayed in real-time in semantic context with elements of the real-world environment.

AR is divided into the following areas from an algorithmic standpoint: (1) marker-based AR: (2) positional-based AR; and (3) object/feature recognition AR. Marker-based AR is based on a computing device or computer identifying artificial markers in the real world (such as QR codes, barcodes, or similar markers) and superimpose computer-generated images based on where the markers are located. Positional-based AR is based on where a user is located, where the user is pointing to, and where the objects of interest are located relative to the user. The computing device then superimposes images on top of the real-world image gathered. With object/feature recognition AR, the computing device recognizes real-world objects directly, and as such, markers are no longer needed.

Figure 1:
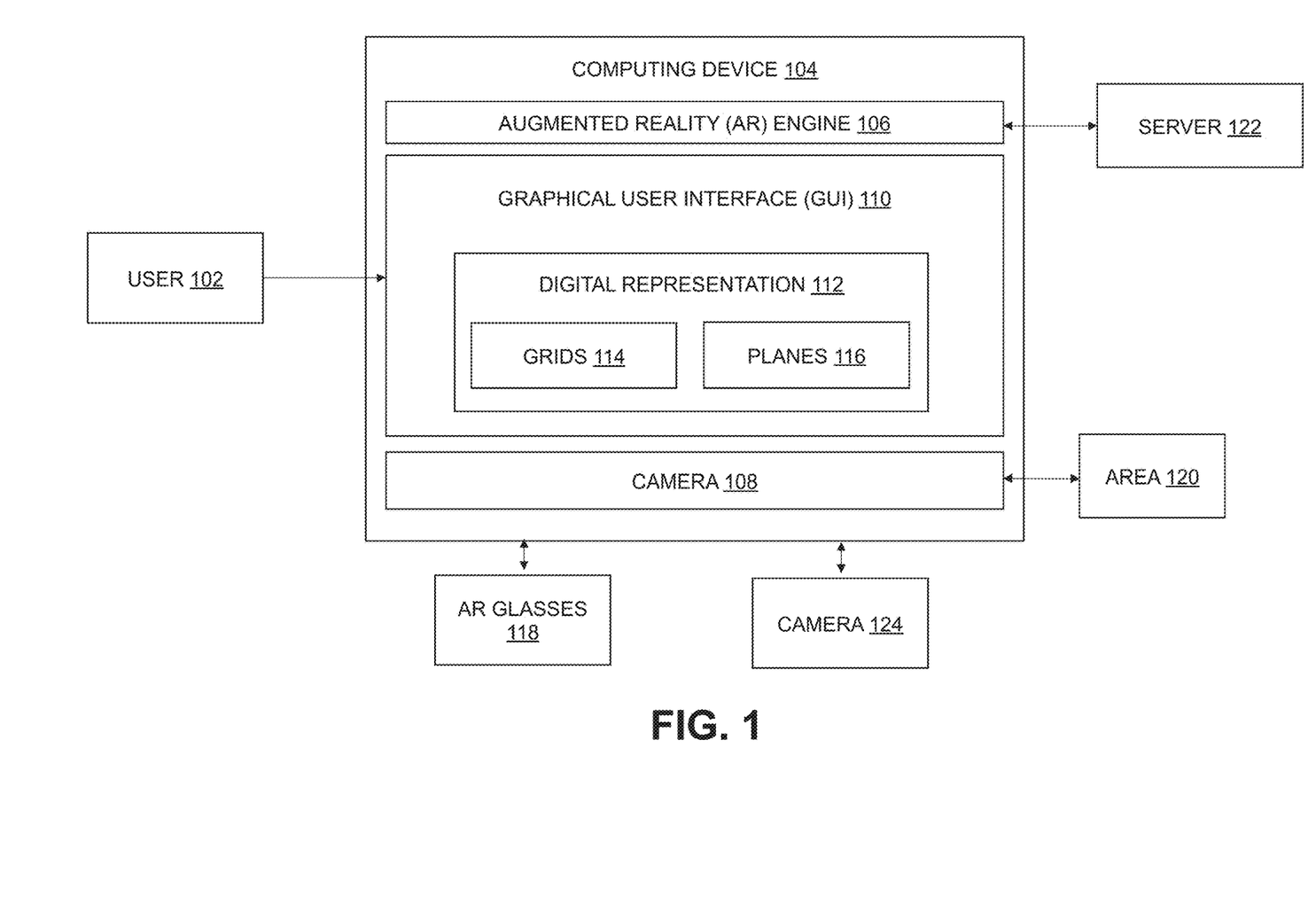
FIG. 1 depicts a schematic diagram of a computer system configured to implement a method for providing an AR visual display to save, according to at least some embodiments disclosed herein.

A computer system configured to implement a method for providing an AR visual display to save is depicted in FIG. 1. The computer system of FIG. 1 includes at least a computing device 104. The computing device 104 may be a computer, a laptop computer, a smartphone, and/or a tablet, among other examples not explicitly listed herein. The computing device 104 may include numerous modules, applications, or engines, such as an AR engine 106, among others.

It should be appreciated that in some implementations, the AR engine 106 may be an application, a software program, a service, or a software platform configured to be executable on the computing device 104. Other devices, such as a first camera 108, may be configured in the computing device 104 or may be external to and connected with the computing device 104 (e.g., a second camera 124). The AR engine 106 may interact with an external server 122, among other external systems not explicitly described herein. In some implementations, AR glasses 118 may be used in conjunction with the AR engine 106.

Further, a user 102 may interact with the computing device 104 via a graphical user interface (GUI) 110. In examples, the user 102 may interact with the GUI 110, where such interaction may include the user 102 submitting login credentials to gain access to the AR engine 106. The login credentials may include a username and a password or a biometric identification means or method (such as a fingerprint identification method, a facial recognition method, a palm print identification method, an iris recognition method, and/or a retina recognition method, among others). In response, the AR engine 106 of FIG. 1 may identify the user 102 based on the login credentials and may grant the user 102 access to the AR engine 106. In other examples, the AR engine 106 of FIG. 1 may fail to identify the user 102 based on the login credentials and may prompt the user 102 to create a profile to be able to access the AR engine 106.

Figure 2:
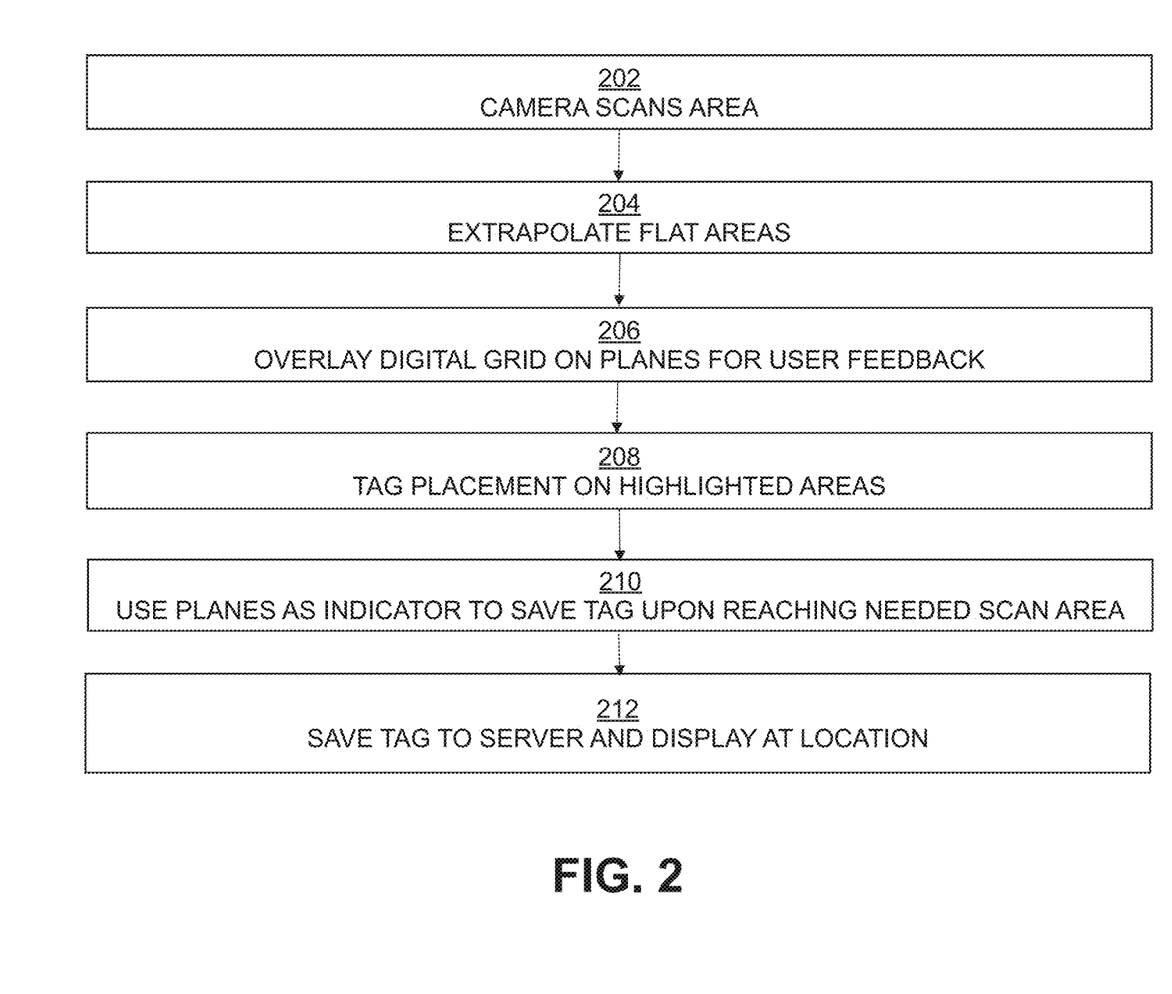
FIG. 2 depicts a block diagram of a method for providing an AR visual display to save, according to at least some embodiments disclosed herein.
Figure 3A:
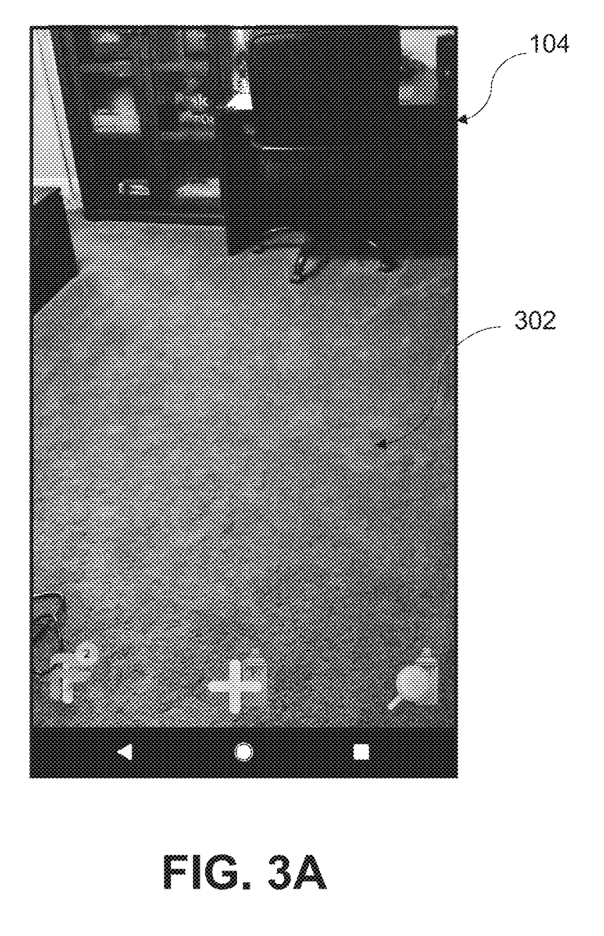
FIG. 3A, FIG. 3B, and FIG. 3C depict schematic diagrams associated with various method steps of FIG. 2, according to at least some embodiments disclosed herein.
Figure 3B:
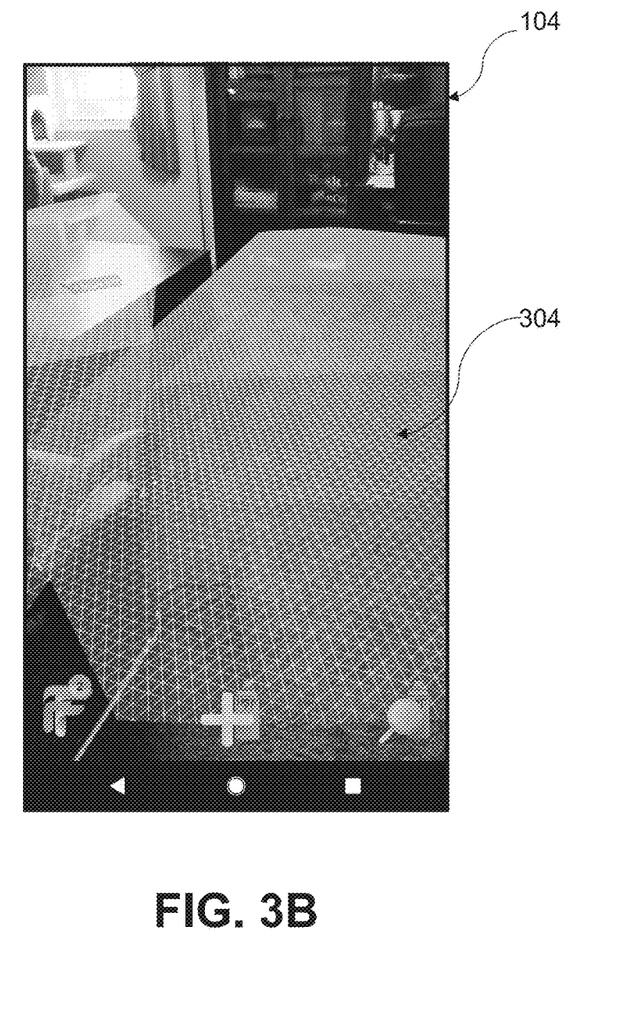
Figure 3C:
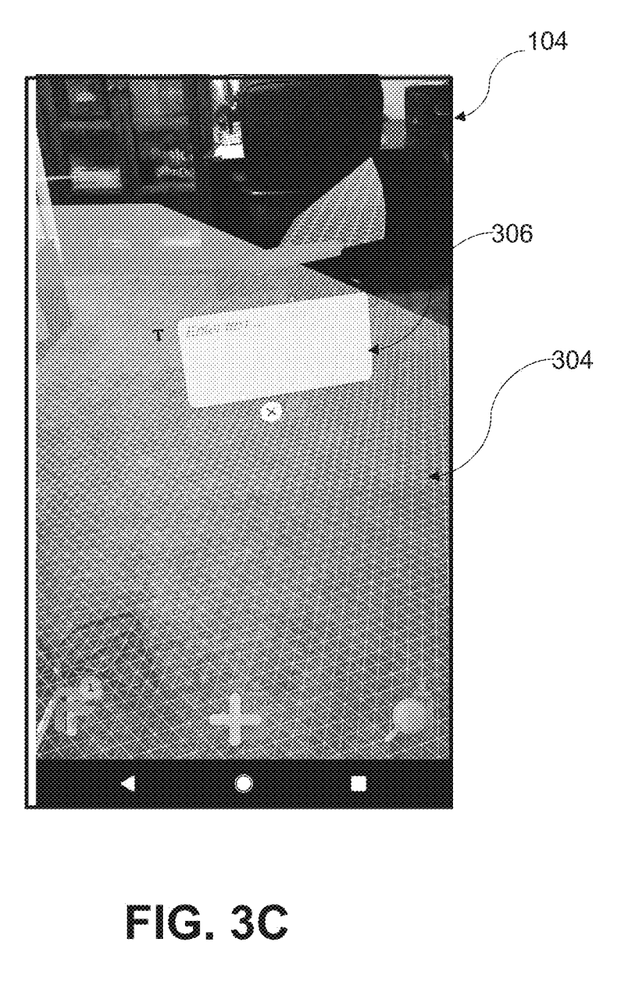

FIG. 2 depicts a block diagram of a method for providing an AR visual display to save, according to at least some embodiments disclosed herein. FIG. 3A, FIG. 3B, and FIG. 3C depict schematic diagrams associated with various method steps of FIG. 2.

The method of FIG. 2 includes begins with a process step 202, where the first camera 108 and/or the second camera 124 scans an area 120 of FIG. 1 or an area 302 of FIG. 3A. A process step 204 follows the process step 202 and includes the AR engine 106 extrapolating flat locations from the area of the process step 202.

Next, a process step 206 follows the process step 204 and includes the AR engine 106 displaying a digital representation 112 of FIG. 1 on the GUI 110 of the computing device 114, which allows a user 102 to place digitally created content. The digitally created content comprises textual content, 2D content, 3D content, video content, and/or audio content. In some implementations, the AR engine 106 may overlay a digital grid 114 of FIG. 1 on the planes 116 of FIG. 1 for user feedback. The overlay may be used to assist the user 102 visually with the scammed areas. In some examples, the AR glasses 118 may be used to visualize the scammed area.

A process step 208 follows the process step 206 and includes the AR engine 106 receiving, from the user 102, a tap action executed a surface 304 of FIG. 3B and FIG. 3C to add or place a tag or anchor 306 (e.g., a local anchor) of FIG. 3C on highlighted portions of the area 302. These tags or anchors 306 allow for viewing from other devices (e g., phones, tablets, etc.).

A process step 210 follows the process step 208 and includes the AR engine 106 using the planes 116 as indicators to save the tags or anchors 306 upon reaching the needed scan area. Moreover, a process step 212 follows the process step 210 and includes the AR engine 106 saving the tags or anchors 306 to the server 122 of FIG. 1 and displaying the tags or anchors 306. The process step 212 ends the method of FIG. 2.

Figure 4:
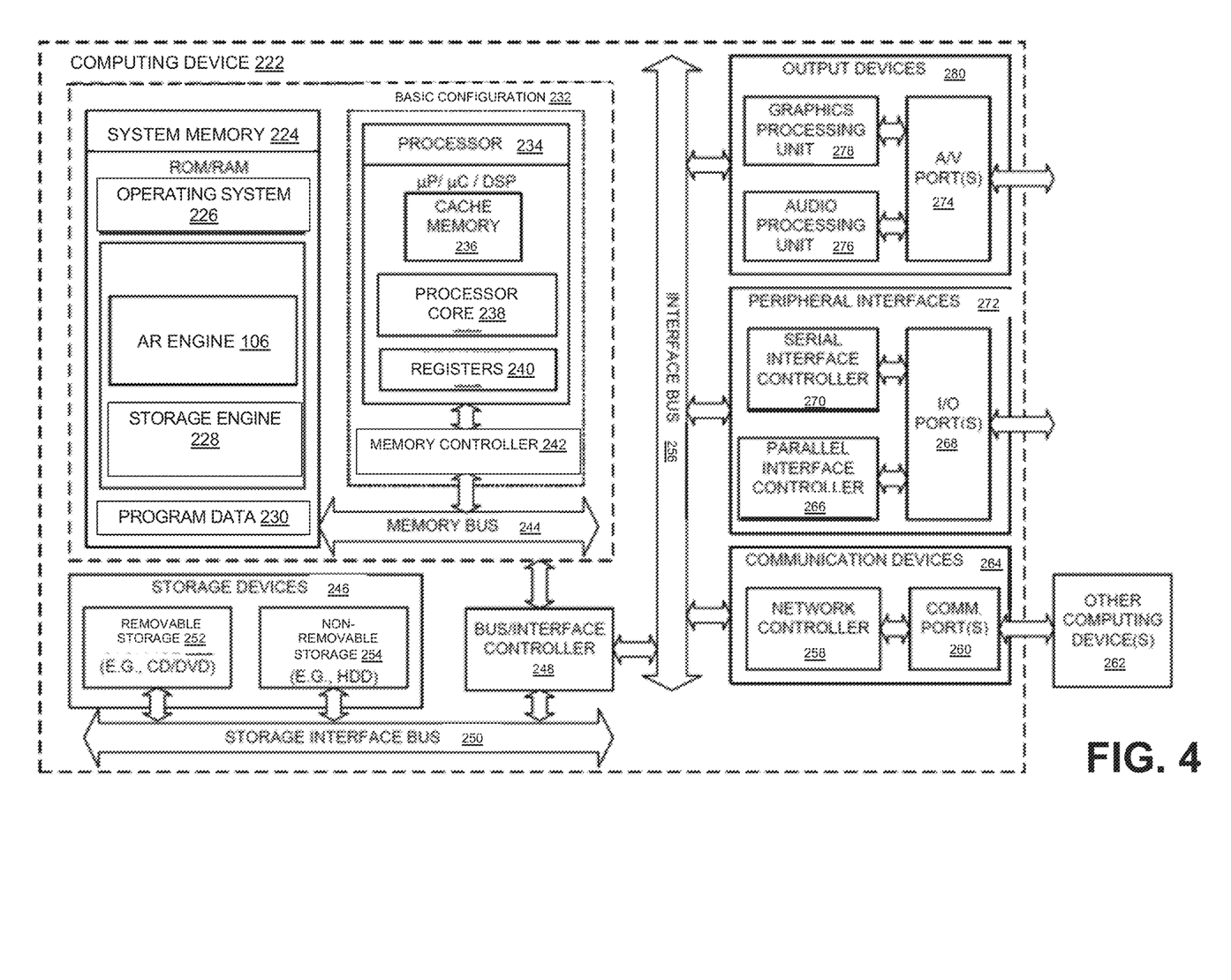
FIG. 4 depicts a block diagram of a computing device included within a computer system of FIG. 1 that is configured to implement a method for providing an AR visual display to save, according to at least some embodiments disclosed herein.

FIG. 4 is a block diagram of a computing device included within the computer system of FIG. 1 that is configured to implement a method for providing an AR visual display to save. In some embodiments, the present invention may be a computer system, a method, and/or the computing device 104 (of FIG. 1) or the computing device 222 (of FIG. 4). A basic configuration 232 of a computing device 222 is illustrated in FIG. 4 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, the processor 234 may be of any type, including, but not limited to, a microprocessor (μP), a microcontroller (μC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the AR engine 106, and program data 230. In some embodiments, the AR engine 106 may be an application, a software program, a service, or a software platform, as described infra. The system memory 224 may also include a storage engine 228 that may store any information disclosed herein.

Moreover, the computing device 222 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code). The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in the method steps for providing an AR visual display to save. In some embodiments. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method executed by a computing device for providing an augmented reality (AR) visual display to save, the method comprising the sequential steps of:
   scanning, by a camera of the computing device, an area;
   extrapolating, by an AR engine of the computing device, flat portions of the area;
   displaying a digital representation of the area via a graphical user interface (GUI) of the computing device to allow a user to place digitally created content;
   receiving, by the AR engine and from the user, an action executed on a display surface of the computing device at a location of the digital representation to add a tag or anchor;
   utilizing, by the AR engine, indicators to save a placement of the tag or the anchor, wherein the indicators are multiple planes located within the digital representation;
   overlaying, by the AR engine, a grid on each of the multiple planes to assist the user with placing the tag or the anchor within the multiple planes within the digital representation;
   transmitting, by the AR engine, the placement of the tag or the anchor to a server; and
   displaying, by the AR engine and via the GUI, the placement of the tag or the anchor.

2. The method of claim 1, wherein the digitally created content is selected from the group consisting of: textual content, two-dimensional (2D) content, three-dimensional (3D) content, video content, and audio content.

3. The method of claim 1, further comprising:
   utilizing AR glasses, by the user, to assist in a visualization of the digital representation.

4. The method of claim 1, wherein the placement of the tag or the anchor allows for viewing from other computing devices.

5. A computer system comprising:
   one or more processors;
   one or more memories; and
   one or more computer-readable hardware storage devices, the one or more computer-readable hardware storage devices containing program code executable by the one or more processors via the one or more memories to implement a method for providing an augmented reality (AR) visual display to save, the method comprising the sequential steps of:
      scanning, by a camera, an area;
      extrapolating flat portions of the area;
      displaying a digital representation of the area via a graphical user interface (GUI) to allow a user to place digitally created content, wherein the digitally created content is selected from the group consisting of: textual content, two-dimensional (2D) content, three-dimensional (3D) content, video content, and audio content;
      receiving, from the user, an action executed on a surface and at a location of the digital representation to add a tag or anchor;
      utilizing indicators to save a placement of the tag or the anchor, wherein the indicators are multiple planes located within the digital representation;
      overlaying, by the AR engine, a grid on each of the multiple planes to assist the user with placing the tag or the anchor within the multiple planes within the digital representation;
      transmitting the placement of the tag or the anchor to a server; and
      displaying, via the GUI, the placement of the tag or the anchor.

6. The computer system of claim 5, wherein the method further comprises:
   utilizing AR glasses, by the user, to assist in a visualization of the digital representation.

7. The computer system of claim 5, wherein the placement of the tag or the anchor allows for viewing from other computing devices.

8. A computing device comprising at least:
   a camera configured to scan an area;
   one or more processors for executing program code stored in one or more memories to implement:
   an augmented reality (AR) engine configured to extrapolate flat portions of the area;
   a graphical user interface (GUI) configured to display a digital representation of the area to allow a user to place digitally created content;
   the AR engine being further configured to execute the sequential steps of:
      receiving an action executed on a surface and at a location of the digital representation to add a tag or anchor;

utilizing indicators to save a placement of the tag or the anchor, wherein the indicators are multiple planes located within the digital representation;

overlaying, by the AR engine, a grid on each of the multiple planes to assist the user with placing the tag or the anchor within the multiple planes within the digital representation; and transmitting the placement of the tag or the anchor to a server; and wherein the GUI is further configured to display the placement of the tag or the anchor.

9. The computing device of claim 8, wherein the digitally created content is selected from the group consisting of: textual content, two-dimensional (2D) content, three-dimensional (3D) content, video content, and audio content.

10. The computing device of claim 8, wherein the placement of the tag or the anchor allows for viewing from other computing devices.

\* \* \* \* \*